United States Patent [19]

Chalfant

[11] Patent Number: 4,596,095

[45] Date of Patent: Jun. 24, 1986

[54] UNDERFLOOR CABLE TRAY ASSEMBLY

[75] Inventor: Thomas W. Chalfant, Westlake, Ohio

[73] Assignee: Chalfant Manufacturing Company, Cleveland, Ohio

[21] Appl. No.: 630,637

[22] Filed: Jul. 13, 1984

[51] Int. Cl.⁴ ............................ E04B 5/48; E04F 17/08
[52] U.S. Cl. ...................................... 52/126.6; 52/220
[58] Field of Search ...................... 52/220, 221, 126.6; 285/64; 138/106

[56] References Cited

U.S. PATENT DOCUMENTS

| | | | |
|---|---|---|---|
| 922,368 | 5/1909 | Wachtel, Jr. | 52/221 |
| 2,353,883 | 7/1944 | Dickey | 285/64 X |
| 2,912,197 | 11/1959 | Hudson | 248/49 |
| 2,917,083 | 12/1959 | Duvall et al. | 138/75 |
| 2,956,587 | 10/1960 | Fisher | 138/75 |
| 3,003,794 | 10/1961 | Burley | 285/121 |
| 3,061,663 | 10/1962 | Reiland | 174/49 |
| 3,137,468 | 6/1964 | Meinders | 243/49 |
| 3,303,264 | 2/1967 | Saul et al. | 174/48 |
| 3,312,251 | 4/1967 | Marks et al. | 138/158 |
| 3,316,680 | 5/1967 | Chrastek | 52/126 |
| 3,324,614 | 6/1967 | Loewenau | 52/126 |
| 3,541,224 | 11/1970 | Joly | 174/72 |
| 3,577,863 | 5/1971 | Hudnall | 52/220 |
| 3,670,764 | 6/1972 | Tindal | 52/220 X |
| 3,924,370 | 12/1975 | Cauceglia et al. | 52/126 |
| 3,943,414 | 3/1976 | Timmermeyer et al. | 317/122 |
| 3,973,366 | 8/1976 | Balane et al. | 52/99 |
| 4,016,357 | 4/1977 | Abrahamsen | 174/48 |
| 4,232,845 | 11/1980 | Turner | 248/49 |
| 4,255,611 | 3/1981 | Propst et al. | 174/48 |
| 4,296,574 | 10/1981 | Stephens | 52/27 |

FOREIGN PATENT DOCUMENTS

| | | | |
|---|---|---|---|
| 1306680 | 9/1962 | France | 52/126.6 |
| 1359353 | 3/1964 | France | 52/126.6 |
| 106921 | 8/1979 | Japan | 52/220 |

OTHER PUBLICATIONS

Robroy Industries, a publication, p. 21.
U.S. Gypsum Globe Tray, a publication, 8-1979, 52 pages.

Primary Examiner—Alfred C. Perham
Attorney, Agent, or Firm—Pearne, Gordon, Sessions, McCoy, Granger & Tilberry

[57] ABSTRACT

An underfloor cable tray assembly is combined with a raised floor and is intermediate the raised floor and a subfloor which supports both in an electrical equipment room. Uniformly spaced stanchions support raised floor joists and floor panels to establish the raised floor for the equipment. Instead of having the communication cables strung without order on the subfloor, the underfloor cable tray assembly is provided to route such communication cables in an orderly manner among the various pieces of equipment. The cable tray assembly is formed from modular cable tray sections having a U-shape in cross section and selected from straight sections, horizontal bends, horizontal tees, and crosses. Splice plates and threaded fasteners interconnect these selected cable tray sections to form the complete cable tray assembly. The top of the cable tray assembly is below the bottom of the floor joists, and the bottom of the cable tray assembly is above the subfloor so as to permit routing of power cables or other pipes or conduits below the cable tray assembly. The foregoing abstract is merely a resume of one general application, is not a complete discussion of all principles of operation or applications, and is not to be construed as a limitation on the scope of the claimed subject matter.

18 Claims, 3 Drawing Figures

UNDERFLOOR CABLE TRAY ASSEMBLY

BACKGROUND OF THE INVENTION

Cable trays have been used in power stations and large industrial plants for a number of years to support cables as an alternative to placing them in conduit. Such cable trays are generally supported from the wall or ceiling, at levels above a person's head while standing, in order to avoid obstructing normal floor space. Such cable tray installations are shown in U.S. Pat. Nos. 3,137,468 and 4,232,845.

Distribution ducts for wires or cables, generally smaller in cross section than those on cable trays, have also been suggested. Again, the distribution ducts are normally mounted from the ceiling or wall at elevations so as not to interfere with a person standing on the floor, again to conserve floor space. Such ducts are often in sections, and can be assembled end-to-end to form wire way for cable duct. Examples of such ducts are shown in U.S. Pat. Nos. 2,917,083; 2,956,587; 3,003,794; 3,312,251; and 3,541,224.

In many multifloor buildings, a current practice is to utilize concrete floors. Electrical conductor distribution ducts have been provided inside the concrete of these floors for many years in order to provide electrical power distribution to the many locations within the building. Examples of such distribution ducts within the concrete floor are shown in U.S. Pat. No. 2,912,197; 3,061,663; 3,303,264; and 3,973,366.

In more recent years, computer rooms, data processing rooms, and electronic equipment rooms in general have been rooms wherein the overhead wiring approach has been minimized in favor of the distribution of wires and cables on top of the concrete subfloor and below a removable-panel, raised floor on which the electrical equipment is placed. This type of raised floor on a subfloor is shown in U.S. Pat. Nos. 3,324,614; 3,924,370; and 4,296,574. U.S. Pat. No. 3,316,680 shows a raised floor supported on floor joists which are also the cable distribution duct, and both carried by the same upright posts. U.S. Pat. No. 4,016,357 shows the typical installation of communication cables wandering in all directions and lying on the concrete subfloor.

Other solutions to the electrical interconnection problem have been suggested. For example, U.S. Pat. No. 3,943,414 shows a pallet approach with the electrical equipment resting on the top of the pallet and the cables passing through apertures in the girdered interior of the pallet. U.S. Pat. No. 4,255,611 shows the electrical connections made to junction boxes behind what might be considered a baseboard for walls of the room.

The space between the subfloor and the raised panel floor is of necessity rather restricted. There are a number of times when there is moisture on the floor, such as due to condensation.

Modular duct sections have been used under a raised floor, but resting on the floor, so that there was no space for cable or other conductors below such modular ducts, which were interconnected to form a continuous ductwork.

With the increased complexity of electronic equipment and the increased number of pieces of equipment with a single room, the interconnection of these by communication cables and power cables has become more complex. The cables on a concrete subfloor in a computer room have come to look like a mass of spaghetti. The cables have become so entangled that it is most difficult to pull out one particular cable from the mass on the floor should it need to be changed or rerouted for any reason.

SUMMARY OF THE INVENTION

The problem to be solved, therefore, is how to provide better order out of chaos in the routing of cables in the various pieces of equipment in a room of electronic equipment.

This problem is solved by an underfloor cable tray assembly for use with a subfloor and an electrical equipment room raised floor supported above the subfloor, said underfloor cable tray assembly comprising, in combination, modular cable tray sections having a U-shape in cross section and including straight sections, horizontal bends, horizontal tees, and horizontal crosses, means to interconnect and support said cable tray sections, said interconnecting means interconnecting selected ones of said sections to form a cable tray assembly permitting communication cables to be routed therethrough to the electrical equipment in the room, and said supporting means supporting said cable tray assembly with the top thereof below the bottom of the raised floor and with the bottom of said cable tray assembly above the subfloor so as to establish cable routing space below the bottom of the cable tray assembly.

The problem is further solved by a combined raised floor and cable tray assembly comprising in combination vertical stanchions supportable on a subfloor, modular floor panels, means to support said floor panels on said stanchions as a raised floor assembly, modular cable tray sections each having a substantially U-shaped cross section with a cable support area and two upright side areas, said cable tray modular sections being selected from straight sections, horizontal bends, horizontal tees, and horizontal crosses, means to secure and support said modular sections, said securing means securing selected ones of said modular sections together in end-to-end relationship to form a cable tray assembly in areas non-interfering with said stanchions and providing a continuous cable tray for communication cables passing therethrough for connecting to electrical equipment above the raised floor assembly, and said supporting means supporting said cable tray assembly with the top of said cable tray assembly below the bottom of said raised floor and the bottom of said cable tray sections above said subfloor in order to provide space between said subfloor and the bottom of said cable tray assembly for other cables leading to the electrical equipment.

Accordingly, an object of the invention is to provide an underfloor cable tray assembly which provides for the orderly arrangement of cables interconnecting equipment in a room and which also provides additional space for other conductors or power cables on the floor beneath the cable tray.

Another object of the invention is to provide a cable tray assembly intermediate a subfloor and a raised floor.

A further object of the invention is to provide a cable tray assembly which is supported above a subfloor independently from the support of the raised floor above the cable tray assembly.

Other objects and a fuller understanding of the invention may be had by referring to the following description and claims, taken in conjunction with the accompanying drawing.

DESCRIPTION OF THE PREFERRED EMBODIMENTS

Figure 1:
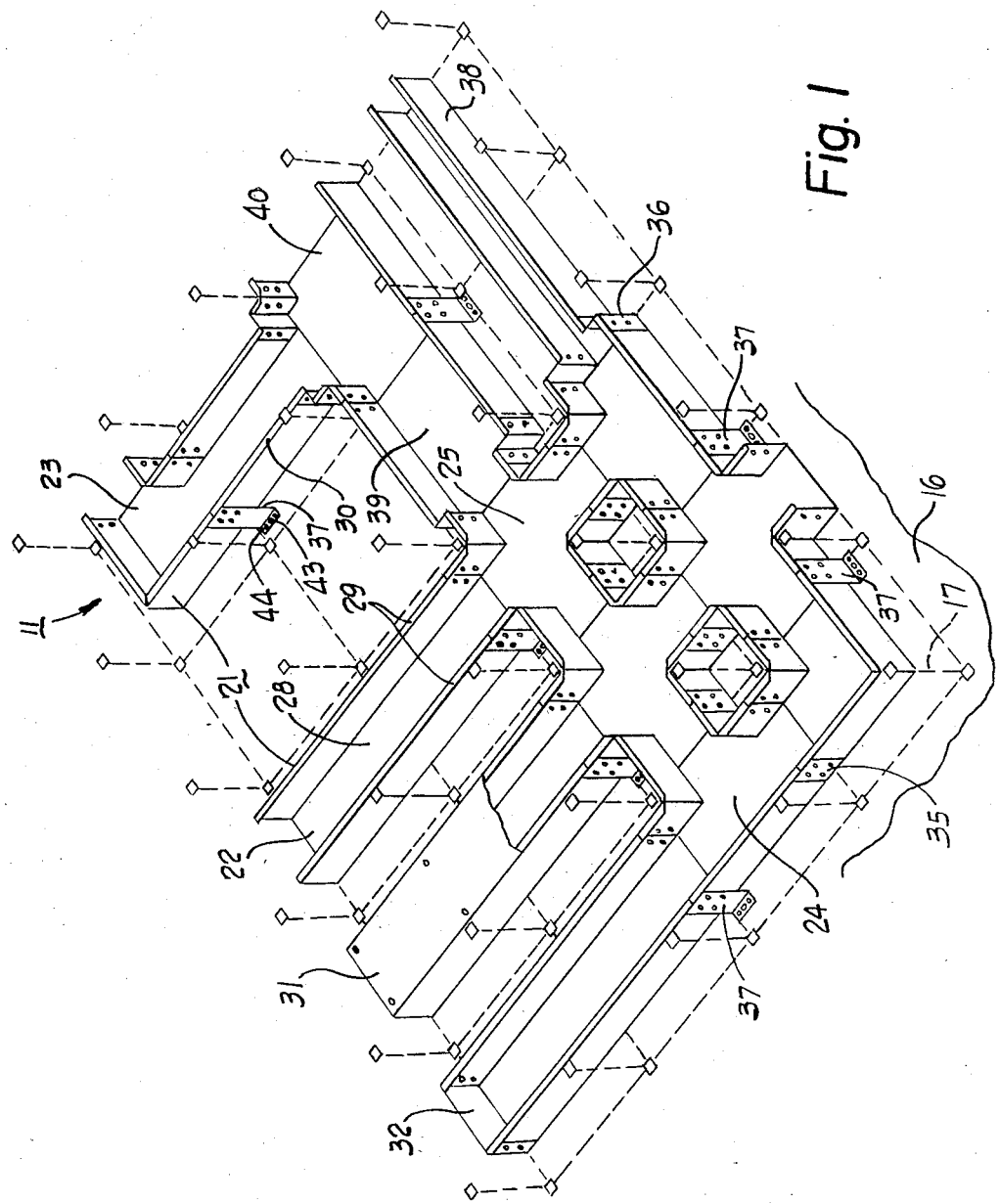
FIG. 1 is an isometric view of a modular cable tray assembly according to the invention.
Figure 3:
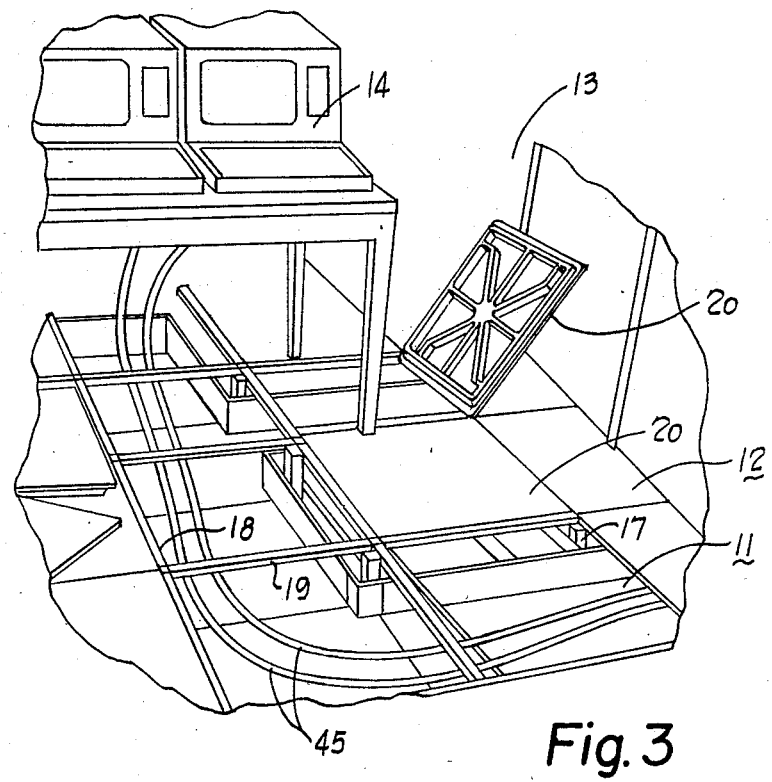
FIG. 3 is a perspective view of a cable tray assembly and raised floor with electronic equipment.

FIG. 1 illustrates a modular cable tray assembly 11, and FIG. 3 illustrates its combination with a raised floor 12. The combined raised floor 12 and cable tray assembly 11 is especially adaptable to be used in an electronic equipment room 13, such as a room containing computer or data processing equipment 14. The room has a permanent floor or subfloor 16, which may be the usual concrete floor in a typical building. The raised floor 12 is supported above this subfloor, and this height is usually about 12 inches, or 30 cm. The raised floor is supported on vertical stanchions 17 which are supported on and usually secured to the subfloor 16 in a regular grid pattern. Typically, this grid pattern may be 24-inch or 60 cm. spacing on centers. The raised floor 12 is supported at the top of these stanchions 17, and preferably raised horizontal floor joists 18 are supported on the top of the stanchions, together with crossbeams 19, to define a grid pattern which will receive the modular floor panels 20. The stanchions 17 are usually adjustable in vertical height to make the raised floor 12, consisting of the floor panels 20, in a smooth, horizontal plane. The floor joists and the crossbeams are secured to the top of the stanchions to form a secure support for the floor panels 20.

The modular cable tray assembly 11 is better shown in FIG. 1, which only diagrammatically illustrates the stanchions 17 in their regular spacing. This cable tray assembly 11 is formed from modular sections which have a U-shape in cross section. The cable tray modules 21 include straight sections 22, 90-degree horizontal bends 23, horizontal tees 24, and horizontal crosses 25. Each of these modular sections is U-shaped in cross section with a bottom wall or cable support area 28, and two upright side areas or vertical side walls 29. Also preferably at the upper end of the side walls is an inturned, horizontal flange 30. Flat covers 31 may be secured to these flanges by sheet metal screws to complete the cable tray assembly 11. Blind ends 32 are provided to close the end of a modular section and three different types of splice plates are utilized. Flat splice plates 35 may be used to connect together two modules 21 of the same width. Reducer splice plates 36 may be used to interconnect two modules of different widths, and a support splice plate 37 may be used to connect together modules of the same width and to support the cable tray assembly intermediate the subfloor 16 and the raised floor 12.

The modules in FIG. 1 are shown of an intermediate width, e.g., 12-inch width and 6-inch depth, but they are also supplied in different widths. For example, the narrower width of 6-inch wide straight section 38 is joined by the reducer splice plates 36 to the 12-inch wide section. Also, the reducer splice plates are used to join the 12-inch wide cross tee 25 to an 18-inch wide straight section 39. The horizontal bends, horizontal tees, and horizontal crosses are also supplied in these same three widths, such as the 18-inch wide tee 40. Threaded fasteners 42, such as bolts and nuts, are used to interconnect the cable tray modules in conjunction with the splice plates 35-37. The pre-established apertures in the cable tray modules 21 may be slightly elongated in a horizontal direction in order to facilitate interconnection, even if the apertures are not perfectly aligned with those in the splice plates. They also may be enlarged in a vertical direction to permit slight height adjustment.

In FIG. 1, it will be noted that the modular cable tray assembly 11 is assembled from selected ones of the various cable tray modules 21. Such modules have a nominal length dimension of 24 inches, the same as the dimension between adjacent stanchions 17. Straight sections may be supplied in different lengths, such as 1 foot and 2, 4, 8, and 12 foot lengths, to accommodate all types of installations. The cable tray assembly 11 avoids the stanchions 17 and, in many cases, encircles such stanchions to provide a continuous cable way or duct way for communications cables or the like to connect to the equipment 14.

The support splice plates 37 are of various heights to support the cable tray assembly 11 at different heights above the subfloor 16. Thus various heights might be 2, 4, 6, or 8 inches, for example, so that the bottom of the cable tray assembly 11 is above the subfloor and the top of the cable tray assembly is below the bottom of the raised floor 12. This permits room below the cable tray assembly for other cables, conduits, pipes, or the like which may be provided in the equipment room 13. The support splice plates 37 may have a slot 43 in a foot 44 to receive a lag screw or other threaded securing means to secure the support splice plates to the subfloor 16.

Figure 2:
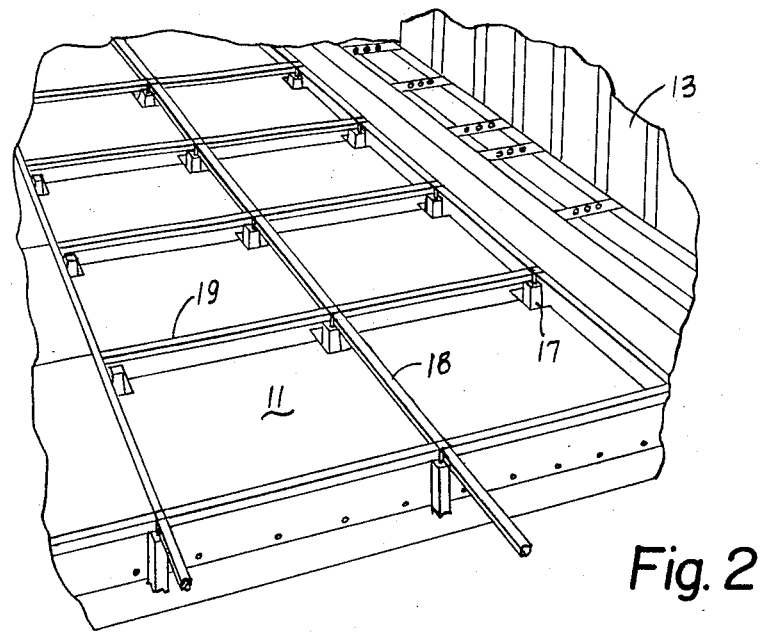
FIG. 2 is an isometric view of a cable tray assembly and raised floor supports.

FIG. 2 shows a typical installation of a modular cable tray assembly 11 with the covers in place so that the entire assembly system is secure.

FIG. 3 illustrates the combined cable tray assembly 11 and the raised floor 12, with the covers 31 removed from the cable tray assembly. A few communication cables 45 are shown in FIG. 3 in the cable tray assembly 11 leading out of the room 13 and connecting to the electronic equipment 14 within the room. When all of the communication cable connections are made, the covers 31 may be installed on the cable tray assembly. When all of the other connections to the equipment 14 are made, such as power cables, pipes, or conduits, which utilize the space below the cable tray assembly 11, the floor panels 20 may be replaced to complete the raised floor 12 and then the room is ready for use.

The support splice plates 37 keep the cable tray assembly elevated above the subfloor 16, so that if there is any moisture on that floor, the communication cables 45 are kept clean and dry and secure within the cable tray assembly 11. Also, this assembly establishes definite routes for the communication cables so that they are in orderly position rather than being jumbled like spaghetti just on the subfloor 16. When so strung, as in the prior art, they tend to become entangled and it is difficult to separate them, especially if it is necessary to remove one after many others have been placed on top. The space between the subfloor and the raised floor 12 may often be utilized as a part of an air conditioning plenum for the equipment room 13, and the fact that the cable tray assembly 11 is raised above the subfloor helps to keep the communication cables cool. Also, the utilization of the cable tray assembly 11 to separate the communication cables from the power cables helps to eliminate electromagnetic frequency interference. This is especially true where the cable trays are of metal and are imperforate so that they act as electromagnetic shielding. This will shield the communication cables from surges in current in the power cables, which otherwise could cause electromagnetic interference and errors in the data transmitted to the equipment 14. Such errors in data transmission can be quite serious. The covered and imperforate cable tray assembly is also advantageous in keeping mice from gnawing on the cables. The separation of power cables below from communication cables within the cable tray assembly permits use of communication cables with a lower quality and lower cost jacket on the cables.

The support splice plates 37 form the dual function of supporting the cable tray assembly 11 above the subfloor, and also interconnecting the various modules. These support splice plates 37 are of various heights in order to provide variable height support of the cable tray assembly. Such splice plates may be considered as having depending legs adapted to engage the subfloor, and preferably to have the feet 44 at right angles to the legs so that they may be secured to the subfloor by means of the slotted aperture 43 and a threaded fastener.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An underfloor cable tray assembly for use with a subfloor and an electrical equipment room raised floor supported above the subfloor, said underfloor cable tray assembly comprising, in combination:
   modular cable tray sections having a U-shape in cross section and including straight sections, horizontal bends, horizontal tees, and horizontal crosses;
   means to interconnect and support said cable tray sections;
   said interconnecting means interconnecting selected ones of said sections to form a cable tray assembly permitting communication cables to be routed therethrough to the electrical equipment in the room;
   said supporting means adapted to support said cable tray assembly with a top thereof below a bottom of a raised floor and with a bottom of said cable tray assembly above a subfloor so as to establish cable routing space below the bottom of the cable tray assembly, wherein said interconnecting and support means includes threaded fasteners and splice plates between sections, with some of said splice plates including depending legs each with a unitary foot extending below the bottom of said cable tray assembly adapted to engage a subfloor to support said cable tray assembly.

2. An underfloor cable tray assembly as set forth in claim 1, wherein said U-shaped cross section of said cable tray sections includes a cable support area and two upright side areas.

3. An underfloor cable tray assembly as set forth in claim 2, including flanges on the upper ends of said upright side areas.

4. An underfloor cable tray asembly as set forth in claim 3, including covers securable to said flanges to cover said cable tray assembly.

5. An underfloor cable tray assembly as set forth in claim 1, wherein said cable tray sections have imperforate walls and covers to enclose said cable tray assembly.

6. An underfloor cable tray assembly as set forth in claim 1, wherein said modular cable tray sections are selected so as to have dimensions and routing to avoid interference with any support of a raised floor with which the cable tray assembly may be used.

7. An underfloor cable tray assembly as set forth in claim 1, wherein said supporting means includes variable height support legs.

8. An underfloor cable tray assembly as set forth in claim 1, where-in said feet on said depending legs are adapted to be secured to a subfloor.

9. An underfloor cable tray assembly as set forth in claim 1, wherein each of said feet is unitary with and bent from the material of the respective depending leg.

10. A combined raised floor and cable tray assembly comprising in combination:
    vertical stanchions supportable on a subfloor;
    modular floor panels;
    means to support said floor panels on said stanchions as a raised floor assembly;
    modular cable tray sections each having a substantially U-shaped cross section with a cable support area and two upright side areas;
    said cable tray modular sections being selected from straight sections, horizontal bends, horizontal tees, and horizontal crosses;
    means to secure and support said modular sections;
    said securing means securing selected ones of said modular sections together in end-to-end relationship to form a cable tray assembly in areas non-interfering with said stanchions and providing a continuous cable tray for communication cables passing therethrough for connecting to electrical equipment above the raised floor assembly;
    said supporting means supporting said cable tray assembly with a top of said cable tray assembly below a bottom of said raised floor and a bottom of said cable tray sections above the subfloor in order to provide space between the subfloor and the bottom of said cable tray assembly for other cables leading to the electrical equipment, wherein a part of said supporting means is included in a part of said securing means.

11. A combined raised floor and cable tray assembly as set forth in claim 12, including raised floor joists supportable on said stanchions and
    said floor panels supportable on said floor joists.

12. A combined raised floor and cable tray assembly as set forth in claim 12, wherein said supporting means includes variable height supports securable to the subfloor at locations remote from said stanchions.

13. A combined raised floor and cable tray assembly as set forth in claim 12, including covers on said cable tray assembly.

14. A combined raised floor and cable tray assembly as set forth in claim 12, wherein said cable support area and upright side areas of said modular sections are continuous imperforate metal walls.

15. A combined raised floor and cable tray assembly as set forth in claim 12, wherein said securing and supporting means includes flat splice plates, reducer width splice plates, variable height footed splice plates, and threaded fasteners.

16. A combined raised floor and cable tray assembly as set forth in claim 10, wherein splice plates and threaded fasteners are included in said securing means to secure together said selected modular sections.

17. A combined raised floor and cable tray assembly as set forth in claim 16, wherein said splice plates have a variable height extending to the subfloor as said part of said supporting means.

18. A combined raised floor and cable tray assembly as set forth in claim 17, including horizontal feet on said splice plates securable to the subfloor.

* * * * *

UNITED STATES PATENT AND TRADEMARK OFFICE
CERTIFICATE OF CORRECTION

PATENT NO. : 4,596,095
DATED : June 24, 1986
INVENTOR(S) : Thomas W. Chalfant

It is certified that error appears in the above-identified patent and that said Letters Patent is hereby corrected as shown below:

Column 6. Claim 11. line 51. delete "12" and insert --10--;

Claim 12. line 55. delete "12" and insert --10--;

Claim 13. line 59. delete "12" and insert --10--;

Claim 14. line 62. delete "12" and insert --10--; and

Claim 15, line 66. delete "12" and insert --10--.

Signed and Sealed this

Seventh Day of June, 1994

Attest:

BRUCE LEHMAN

Attesting Officer     Commissioner of Patents and Trademarks